No. 804,898. PATENTED NOV. 21, 1905.
H. TARBUCK.
FASTENER FOR DRIVING BELTS OR BANDS.
APPLICATION FILED JAN. 4, 1905.

Witnesses
Inventor
Herbert Tarbuck

UNITED STATES PATENT OFFICE.

HERBERT TARBUCK, OF BIRMINGHAM, ENGLAND.

FASTENER FOR DRIVING BELTS OR BANDS.

No. 804,898. Specification of Letters Patent. Patented Nov. 21, 1905.

Application filed January 4, 1905. Serial No. 239,671.

*To all whom it may concern:*

Be it known that I, HERBERT TARBUCK, a subject of the King of Great Britain, residing at 45 Claremont road, Sparkbrook, in the city of Birmingham, England, have invented new and useful Improvements Relating to Fasteners for Driving Belts or Bands, of which the following is a specification.

This invention relates to driving belt or band fasteners of the type in which clamping or like metallic plates are employed for connecting the two ends of the leather or other strap or belt to make the latter of a continuous form.

The object of my invention is to provide in a simple and convenient manner for the more effective and reliable union of the aforesaid ends, and thus prevent accidental detachment when in service by a gradual pulling of the same from the fastener under the tension imposed upon the belt or band when transmitting power from a driving to a driven wheel or pulley.

The invention comprises a metallic fastener adapted to embrace the ends of a belt and to be so clamped or pressed upon the same as to make joints or connections of a substantially wedge-like formation, such as will effectually resist the withdrawal of the belt ends from the fastener under the tension of working, while relieving the clamping bolts, rivets, or the like from shearing or cross stress.

Figures 1, 2:
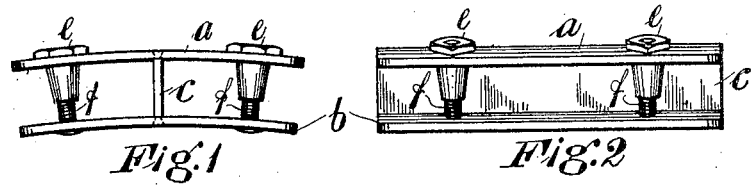
Figure 3:
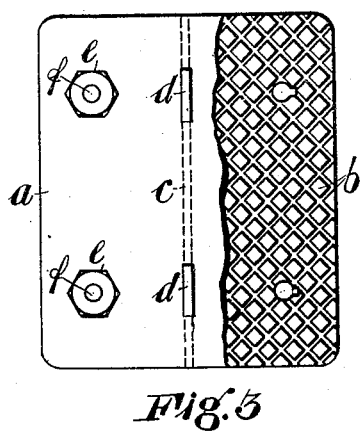
Figure 4:
Figure 5:
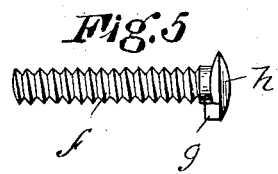
Figure 6:
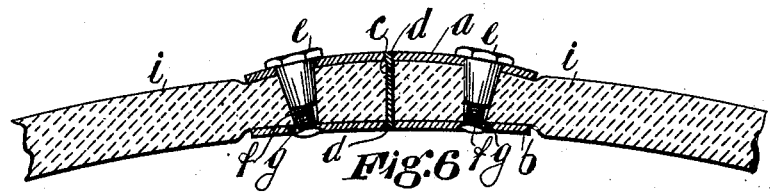
Figure 7:
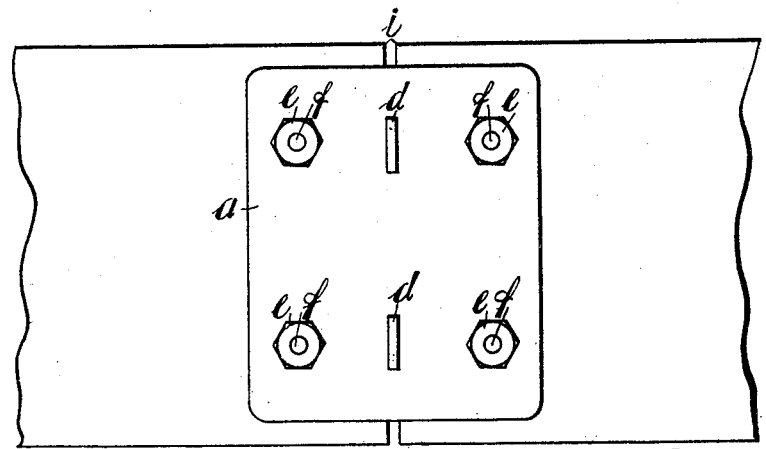

Referring to the accompanying sheet of explanatory drawings, Figure 1 is an end elevation, and Fig. 2 a side elevation, of one form of my belt-fastener, drawn to an enlarged scale, suitable for use with an ordinary flat or thin rectangular driving belt or band. Fig. 3 is a plan of the fastener with a portion of the top plate removed. Figs. 4 and 5, respectively, illustrate the preferred form of clamping nuts and bolts. Fig. 6 is a sectional elevation, and Fig. 7 a plan, showing the ends of a belt united or connected by the fastener. Figs. 4 and 5 are drawn to a larger scale than that adopted for the other figures.

The same reference-letters in the different views indicate the same or similar parts.

I preferably construct my fastener from a pair of steel or other metal plates, as $a$ and $b$, and an interposed central strip or bridge or strut-piece, as $c$. The said bridge or strut-piece $c$ serves also as the means for rigidly uniting the plates $a$ and $b$, suitable projections, as $d$, being provided on each side of $c$ for riveting in corresponding apertures formed in the respective plates. Holes are made through the plates $a$ and $b$ for the reception of the clamping bolts and nuts, those in one plate being provided with slots so as to form a keyhole. (See Fig. 3.) The said bolts and nuts are preferably of the form illustrated at Figs. 4 and 5, respectively. The nut $e$ is provided with a conical extension, as shown at Fig. 4. The bolt $f$ is fitted or provided with a snug $g$ beneath the head $h$, as shown at Fig. 5, which engage in the slots of the keyholes.

For the connection of the ends of a belt, as $i$, by means of my fastener the clamping bolts and nuts are removed and bolt-holes are punched through the belt ends to correspond with the like holes in the fastener. The belt ends are then pushed in from the respective sides of the fastener until they abut against the central bridge or strut $c$. On now reinserting the bolts and nuts in position they enter the holes in the belt, and on tightening up the nuts with a spanner or wrench the outer extremities of the two plates $a$ and $b$ of the fastener are drawn toward and pressed tightly into or upon the leather or other material of which the belt is composed. A joint or connection of a substantially wedge-like formation is thus made with each belt end, as shown at Fig. 6. The said joints or connections effectually resist the withdrawal of the belt from the fastener under the tension of working, while relieving the clamping bolts and nuts from shearing or cross stress. The drawing or compressing of the outer extremities of the fastener, top and bottom plates toward each other, as aforesaid, sets up a spring-like reaction which serves to lock the nuts $e$ in position upon their bolts and so prevent accidental slackening, and thereby placing the parts in relation to each other convergent from the bridge to the ends. To give a greater grip upon the surface of the belt, I preferably chequer or roughen the inner surfaces of the clamping-plates, as with the portion of the inner surface of the plate $b$ (shown at Fig. 3) or in any other manner.

My fasteners are suitable for connecting the ends of driving belts or bands of a square, V, or other section, such as are employed for motor-vehicles and for other services, the number of clamping-bolts or the like parts employed and the precise form or shape of the clamping-plates being in all cases such as are necessary to meet any particular service or requirement.

Having thus described my invention, what I claim as new, and desire to secure by Letters Patent, is—

1. Belt-fasteners consisting of clamping or embracing parts, a bridge or strut between the said parts and means for forcing the parts together at their ends so that the parts converge from the bridge to the ends.

2. In belt-fasteners, the combination consisting of clamping or embracing parts, a central rigid bridge or strut between the said parts and detachable tension devices for drawing the parts together at their ends so that the parts converge from the bridge to the ends.

3. In belt-fasteners, the combination with the belt ends to be united of clamping or embracing parts, a bridge or strut between the said parts, and bolts and nuts entering the belt and the clamping or embracing parts and drawing the parts together at their ends so that the parts converge from the bridge to the ends.

In testimony whereof I have signed my name to this specification in the presence of two subscribing witnesses.

HERBERT TARBUCK.

Witnesses:
 EDWARD MARKS,
 JOHN MORGAN.